Feb. 19, 1929.   1,702,254
W. ESMARCH
ARRANGEMENT FOR THE MANUFACTURE OF OZONE
Filed July 12, 1927
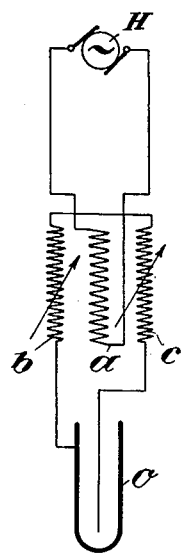
Inventor.
Wilhelm Esmarch
by Locke, Kehlenbeck & Farley
Attorneys.

Patented Feb. 19, 1929.

1,702,254

UNITED STATES PATENT OFFICE.

WILHELM ESMARCH, OF BERLIN, HALENSEE, GERMANY, ASSIGNOR TO SIEMENS & HALSKE, AKTIENGESELLSCHAFT, OF SIEMENSSTADT, NEAR BERLIN, A CORPORATION OF GERMANY.

ARRANGEMENT FOR THE MANUFACTURE OF OZONE.

Application filed July 12, 1927, Serial No. 205,083, and in Germany August 26, 1926.

This invention relates to arrangements for the production of ozone and more particularly to the transformer used for the generation of the high voltage required for the discharge.

Arrangements for the manufacture of ozone have been described, in which undamped high frequency vibrations are used and in which the ozone generator proper is situated as a capacity in an oscillation circuit tuned to the working frequency. The oscillation circuit constituted by the ozone generator and by a variable self induction, is there connected, without any devices increasing the voltage, either directly, or with the use of a coupling capacity, to the high frequency generating apparatus. Such an arrangement cannot however work satisfactorily as the voltages generated are much too low to ensure a sufficient yield of ozone. For that reason, the undamped high frequency currents, generated by a machine, were in nearly every instance transformed to a higher voltage by means of iron core transformers.

It is well known however that the high frequency currents suffer, in iron core transformers, high losses in the form of heat. The losses frequently amount to 100% of the energy absorbed by the ozone generator, so that one half of the energy supplied to the transformer by the machine, is converted into waste heat. This uneconomical method of working is moreover very unreliable as the great heat generated in the transformer core carbonizes the intermediate insulating layers between the iron plates and leads to eddy current short circuit which increase the losses.

These drawbacks are eliminated according to the present invention by the use of a coreless transformer. The secondary winding of the said transformer is from the first dimensioned in such a manner that its self induction, in cooperation with the capacity constituted by the electrodes of the ozone generator, forms an oscillation circuit, the frequency of which practically corresponds to that of the working current. As the self induction of the transformer according to the invention is variable, for instance by the modification of the coupling value of the windings, it thus becomes possible to tune exactly to the working frequency. In order to obtain the highest possible voltages, the numerous secondary windings necessitated thereby can be arranged at both sides of the primary winding, somewhat after the kind of the well known coupling coil holders in wireless receiving sets. By altering the distance of one or both secondary windings from the primary winding, for instance by parallel movement or by rotary movement in the plane of the coil or at right angles to the same, the value of self induction of the transformer can be adapted to a given electrode capacity.

Owing to the elimination of the expensive iron core transformer and to the substitution for the same of the relatively cheap transformer, not only the cost of working but also the first cost is substantially reduced. Special tuning variometers or condensers are also done away with, as the present transformer is itself variable, so that the installation becomes simpler and easier to work.

A construction according to the invention is diagrammatically illustrated by way of example in the accompanying drawing.

The currents from a high frequency machine H or from some other kind of high frequency generator, are sent into the primary coil $a$ of the coreless transformer. At both sides of the primary coil $a$ are arranged in an adjustable manner two secondary coils $b$ and $c$ connected together in series, into the circuit of which is switched the ozone generator O.

What I claim as my invention and desire to secure by Letters Patent is:—

1. In an arrangement for the generation of ozone, the combination of a source of high frequency alternating current, a ozone apparatus, a coreless transformer for producing high tension, inserted between said source and said apparatus and means for tuning the frequency of the secondary circuit of said transformer to the frequency of the primary circuit of said transformer.

2. In an arrangement for the generation of ozone, the combination of a source of high frequency alternating current, an ozone apparatus, a coreless transformer for producing high tension, inserted between said source and said apparatus and means for varying the self induction of said transformer so as to tune the frequency in its secondary circuit to that of its primary circuit.

3. In an arrangement for the generation of ozone, the combination of a machine for producing high frequency alternating current, an ozone apparatus, having electrodes, a coreless high tension transformer inserted between said machine and said apparatus so that an oscillating circuit is formed by the secondary winding of said transformer and the electrodes of said apparatus without additional elements, the coupling of the primary and secondary windings of said transformer being variable for tuning the frequency of said oscillating circuit to that of said machine.

4. In an arrangement for the generation of ozone, the combination of a machine for producing high frequency alternating current, an ozone apparatus having electrodes, a coreless high tension transformer having one primary and two secondary windings and inserted between said machine and said apparatus, so that an oscillating circuit is formed by the two secondary windings of said transformer and the electrodes of said apparatus without additional elements, the coupling between said windings being variable for tuning the frequency of said oscillating circuit to that of said machine.

In testimony whereof I affix my signature.

WILHELM ESMARCH.